(No Model.)
J. MALLIÉ.
FILTER.
No. 312,281. Patented Feb. 17, 1885.
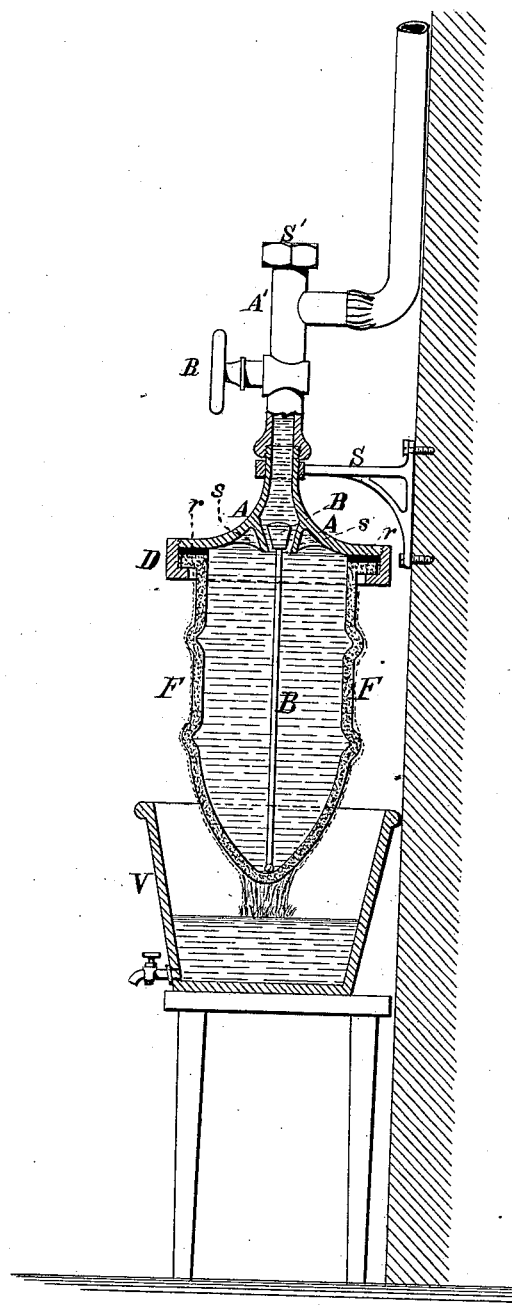
Witnesses:
John C. Tunbridge.
John M. Speer.
Inventor:
Jules Mallié
by his attorneys
Briesen & Steele

United States Patent Office.

JULES MALLIÉ, OF PARIS, FRANCE.

FILTER.

SPECIFICATION forming part of Letters Patent No. 312,281, dated February 17, 18

Application filed November 1, 1884. (No model.)

*To all whom it may concern:*

Be it known that I, JULES MALLIÉ, of the city of Paris, France, have invented an Improved Filter, of which the following is a full, clear, and exact description.

The necessity of obtaining pure water has led to the general employment of filters; but hitherto these have served merely to clarify the water without depriving it of the noxious principles it may contain.

The object of the present invention is to provide a filter which will not only clarify the water, but also retain the germs, animalcules, or organisms held in suspension therein, whereby the water, after passing through the filtering medium, will be rendered physiologically pure without undergoing any alteration in its composition or being deprived of the salts or air necessary for its digestion.

It has been stated by Monsieur Pasteur that it is possible by thorough filtration, combined with suitable pressure, to arrest those organisms or animalcules, microbes, &c., contained in water, which, according to Dr. Koch and others, are the vehicles of endemic and epidemic diseases.

The improved filter of this invention, which may be readily connected to water-service pipes or cisterns, is easily fitted and taken to pieces, so as to enable the filtering medium to be quickly replaced, and is readily cleaned with the aid of boiling water and a brush. It also admits of the employment of large filtering-surfaces, capable of furnishing large supplies of filtered water, and can, if desired, be inclosed in a protective casing.

The apparatus is provided with a safety-valve, and is also arranged to automatically cut off the supply in the event of the filter becoming broken, whereby all danger of flooding is avoided.

The apparatus having the essential features above enumerated may be produced at a sufficiently low rate to allow of its general adoption. The filter proper would be made of any material capable of employment for filtering purposes—such as wood, carbon, earthenware, natural or artificial stone, biscuit, asbestus, or any other material which, from its porosity—whether natural or artificial—and thickness, is capable of effecting the filtration of the liquid or the conditions above stated. The filtering action is operated in an outward direction through the walls of the filter, and the liquid supplied from the pipe or cistern, either under pressure or from a sufficient height to charge the filter, percolates through the porous surface to the outside, where it runs off in a pure condition, cooled, it may be, by the use of ice, or containing certain salts which may have been introduced into the filter. It is unnecessary to add that the form and dimensions of the filter may vary according to circumstances.

As regards the pipes and cocks, I would observe that they may be made of any material not liable to injuriously affect the water, although I prefer to make them of pure tin, to which is added a small quantity of metal or other material to give increased hardness, while still retaining its innocuous character.

The filter may be inclosed in any kind of vessel, but preferably one of transparent material, which serves not only to protect the filtering medium, but also to prevent contact of the liquid with the surrounding air, which is of great importance in hospitals and other infected places.

My improved filter is illustrated, by way of example, in the accompanying drawing, which shows it in vertical section connected to a water-supply pipe.

The following are the different parts of which the filter is composed: F, filter proper, made of any of the materials before mentioned, the walls of which may be ribbed or corrugated on a plane perpendicular to the axis, as shown, in order to afford increased strength as well as a larger filtering-surface; V, vessel to receive the purified water, which may be so modified in form as to completely inclose the filter and form part of the apparatus for the purpose above stated; *r*, washer for insuring a water-tight joint between the filter F and the cover A, the parts being clamped together by a screw-threaded ring, D.

The cover A, which is bell-mouthed, is provided on its interior with a seat, *s*, for the automatic safety-valve B, serving to cut off the water-supply in the event of the filter becoming damaged. The stem of the valve B rests on the inner side of the filter, as shown. Should the filter break, this stem will lose its support and will permit the valve to drop upon the seat $s$, thereby shutting off the flow of the liquid. A', pipe branched onto either the supply-pipe or cistern; R, cock; S, bracket on which the apparatus is supported; S', point at which the safety-valve is placed for varying pressures.

The right is reserved of applying my improved filter to all kinds of pumps or other apparatus for the supply of water under pressure.

I also reserve the right to use this improved filter for purifying other liquids than water, as well as of increasing its filtering-power by ribbing, corrugating, or fluting its surface.

I claim—

The filter F, rigidly connected with the cover A, having a seat, $s$, and supply-pipe leading to the interior of said filter, in combination with the loose valve B, the stem of which rests on the inner side of the filter, thereby holding said valve away from the seat, all arranged to let the valve down upon its seat in case the filter should break, substantially as herein shown and described, for the purpose specified.

The foregoing specification of my improved filter signed by me this 18th day of September, 1884.

JULES MALLIÉ.

Witnesses:
FERDINAND BARBE,
EDWARD P. MACLEAN.